No. 857,227. PATENTED JUNE 18, 1907.
T. BOOTH.
NUT LOCK.
APPLICATION FILED OCT. 15, 1906.

Witnesses

Inventor
Thomas Booth
By
Attorneys

UNITED STATES PATENT OFFICE.

THOMAS BOOTH, OF BOISE, IDAHO.

NUT-LOCK.

No. 857,227.     Specification of Letters Patent.     Patented June 18, 1907.

Application filed October 15, 1906. Serial No. 339,005.

*To all whom it may concern:*

Be it known that I, THOMAS BOOTH, a citizen of the United States, residing at Boise, in the county of Ada and State of Idaho, have invented certain new and useful Improvements in Nut-Locks, of which the following is a specification.

The object of this invention is to provide a novel form of bolt and nut therefor, together with peculiar and novel means for attaching the nut to the bolt and at the same time locking the nut from likelihood of accidental displacement.

It is contemplated by the present invention to do away with the threads such as are used at the present time upon bolts and nuts, thereby cheapening the cost of construction of these parts, from the standpoint of manufacture, permitting of more ready application, attachment and separation of the parts, and giving rise to other advantages which will be apparent upon the description hereinafter.

Figure 1:
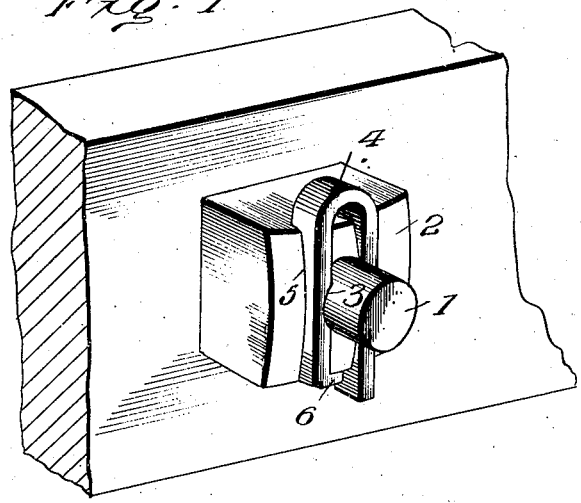
Figure 2:
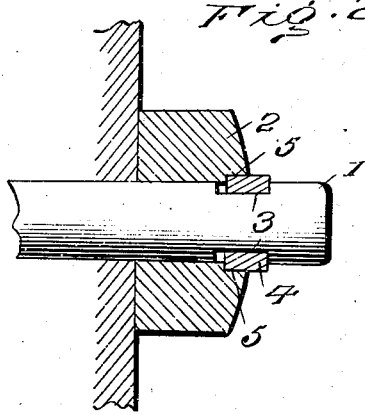
Figure 3:

For a full understanding of the invention and the merits thereof and also to acquire a knowledge of the details of construction of the means for effecting the result, reference is to be had to the following description and accompanying drawings, in which:

Figure 1 is a perspective view of a nut lock embodying the invention. Fig. 2 is a vertical longitudinal sectional view, Fig. 3 is a detail perspective view of the locking key or wedge.

Corresponding and like parts are referred to in the following description and indicated in all the views of the drawings by the same reference characters.

Specifically describing the invention, the numeral 1 designates a bolt of a form somewhat similar to that most commonly in use, but not provided with the usual threaded end portion. The nut 2 is adapted to fit over the end of the bolt opposite that provided with the head and the opening in the nut is unprovided with the usual threads being smooth.

It will be obvious from the foregoing that the nut 2 is adapted to be readily fitted over an end of the bolt 1, and the end portion of the bolt adapted to receive the nut in the above manner is formed at opposite sides with transverse recesses or seats 3. The recesses or seats 3 are adapted to receive the opposite side portions of a transverse locking key or wedge 4, which is utilized to secure the nut to the bolt. In other words describing in the practical operation of the invention after the bolt 1 has been passed through the part or parts to which it is to be applied, the nut 2 is slipped upon the free end of the bolt, said nut being provided on its outer side with spaced grooves or kerfs 5. The locking key or wedge 4 is now arranged so that the sides thereof enter the grooves 5 and by lateral movement of the key the sides will be forced into the recesses or seats 3 in the outer end portion of the bolt. Each side of the key 4 tapers slightly and the outer edge portions of the sides, bearing against the outer walls of the recesses 3, as well as the inner edge portions of the sides bearing against the bottom portions of the grooves or kerfs 5, will have wedging action whereby to very effectively hold the nut 2 against the part to which the bolt is applied and at the same time will prevent displacement of the nut. That is to say the key 4 not only performs the function of means for securing the nut to the bolt 1, but it also prevents any movement of the nut relatively to the bolt by which the nut might possibly be accidentally displaced therefrom. The engagement of the key 4 with the recesses 3 of the bolt prevents turning of the nut, as will be readily apparent. To prevent displacement of the key 4 after it has been arranged in operative position, an extremity of one of the sides of the key is reduced as shown at 6, so as to be readily bent laterally, to form a stop accomplishing the above result.

Having thus described the invention, what is claimed as new is:

In combination, a bolt, a nut disposed thereon and provided with grooves or kerfs in its outer side, the bolt being formed with opposite recesses or seats on its nut receiving end, a longitudinally tapering key of U form comprising sides arranged transversely to the bolt and engaging in the recesses or seats thereof, the sides of the key being also received in the grooves or kerfs in the outer side of the nut, and the outer end of one side of the key being reduced laterally and bent to engage a side of the nut to form a stop to prevent accidental displacement of the key.

In testimony whereof I affix my signature in presence of two witnesses.

THOMAS BOOTH. [L. S.]

Witnesses:
   E. STANLEY,
   F. J. GARVEE.